United States Patent
Johnson et al.

(10) Patent No.: US 9,688,190 B1
(45) Date of Patent: Jun. 27, 2017

(54) LICENSE PLATE ILLUMINATION SYSTEM

(71) Applicant: Ford Global Technologies, LLC, Dearborn, MI (US)

(72) Inventors: Aaron Bradley Johnson, Allen Park, MI (US); Stephen Kenneth Helwig, Farmington Hills, MI (US); Stuart C. Salter, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/070,315

(22) Filed: Mar. 15, 2016

(51) Int. Cl.
*B60Q 1/56* (2006.01)
*B60R 13/10* (2006.01)

(52) U.S. Cl.
CPC .............. *B60Q 1/56* (2013.01); *B60R 13/10* (2013.01)

(58) Field of Classification Search
CPC .......... B60Q 1/56; B60R 13/10; B60R 13/105
USPC .................. 362/497–499, 509–511
See application file for complete search history.

(56) References Cited

U.S. PATENT DOCUMENTS

| | | |
|---|---|---|
| 5,053,930 A | 10/1991 | Benavides |
| 5,150,960 A | 9/1992 | Redick |
| 5,709,453 A | 1/1998 | Krent et al. |
| 5,839,718 A | 11/1998 | Hase et al. |
| 5,934,798 A | 8/1999 | Roller et al. |
| 6,031,511 A | 2/2000 | DeLuca et al. |
| 6,117,362 A | 9/2000 | Yen et al. |
| 6,419,854 B1 | 7/2002 | Yocom et al. |
| 6,471,379 B2 * | 10/2002 | Bucher ............... B60Q 1/56 362/497 |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller et al. |
| 6,871,986 B2 | 3/2005 | Yamanaka et al. |

(Continued)

FOREIGN PATENT DOCUMENTS

| | | |
|---|---|---|
| CN | 201169230 Y | 12/2008 |
| CN | 101337492 A | 1/2009 |

(Continued)

OTHER PUBLICATIONS

Auto Zone, Pilot Automotive/License Plate LED Light, website, last accessed Dec. 22, 2015, www.autozone.com/exterior-lighting/license-plate-lighting/pilot-automotive-license-plate-led-light/873393_0_/?checkfit=true.

(Continued)

*Primary Examiner* — Jason Moon Han
(74) *Attorney, Agent, or Firm* — Jason Rogers; Price Heneveld LLP (57) ABSTRACT

A vehicle is provided that includes a license plate positioned on a rear of the vehicle. The license plate defines a personalized portion and a registration portion. A trim piece is positioned above the license plate and includes an illumination system that includes a waveguide extending the length of the license plate. A light source is optically coupled with the waveguide and configured to emit light into the waveguide. An optical component is configured to be optically coupled with the waveguide.

20 Claims, 8 Drawing Sheets

(56) References Cited

U.S. PATENT DOCUMENTS

| | | | |
|---|---|---|---|
| 6,874,922 B2 | 4/2005 | Matsuura et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,163,322 B2 * | 1/2007 | Tatewaki | B60Q 1/2696 362/497 |
| 7,213,923 B2 | 5/2007 | Liu et al. | |
| 7,213,962 B2 * | 5/2007 | Chen | G02B 6/0021 362/23.01 |
| 7,216,997 B2 | 5/2007 | Anderson, Jr. | |
| 7,222,998 B2 * | 5/2007 | Katase | B60Q 1/56 362/497 |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,262,269 B2 * | 9/2012 | Koizumi | B60Q 1/56 362/244 |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,876,352 B2 | 11/2014 | Robbins et al. | |
| 8,952,341 B2 | 2/2015 | Kingsley et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2006/0097121 A1 | 5/2006 | Fugate | |
| 2007/0006493 A1 * | 1/2007 | Eberwein | B60R 13/10 40/204 |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2011/0012062 A1 | 1/2011 | Agrawal et al. | |
| 2011/0252675 A1 | 10/2011 | Thomas | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |
| 2016/0236613 A1 | 8/2016 | Trier | |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

OTHER PUBLICATIONS

American Muscle, Raxiom License Plate Light LED Conversion Kit (10-14 ALL), website, last accessed Dec. 22, 2015, www.americanmuscle.com/raxiom-plate-led-1012.html.

* cited by examiner

LICENSE PLATE ILLUMINATION SYSTEM

FIELD OF THE INVENTION

The present disclosure generally relates to vehicle lighting systems, and more particularly, to vehicle lighting systems for a rear of the vehicle.

BACKGROUND OF THE INVENTION

Illumination systems used in vehicles may offer a unique and attractive viewing experience. It is therefore desired to incorporate such illumination systems in portions of vehicles to provide accent and functional lighting.

SUMMARY OF THE INVENTION

According to one aspect of the present disclosure, a vehicle is provided that includes a license plate positioned on a rear of the vehicle. The license plate defines a personalized portion and a registration portion. A trim piece is positioned above the license plate and includes an illumination system that includes a waveguide extending the length of the license plate. A light source is optically coupled with the waveguide and configured to emit light into the waveguide. An optical component is configured to be optically coupled with the waveguide.

According to another aspect of the present disclosure, a vehicle is provided that includes a license plate positioned on a rear of the vehicle and an illumination system positioned proximate the license plate that includes a waveguide defining an aperture. A first light source is optically coupled with an end of the waveguide and configured to emit light into the waveguide and an optical component is configured to be inserted within the aperture and interact with light within the waveguide.

According to yet another aspect of the present disclosure, a method of illuminating a license plate is provided that includes directing a first light from a light source into an end of a waveguide, illuminating a first portion of a license plate using the light, filtering a portion of the light using an optical component positioned within the waveguide, and illuminating a second portion of the license plate using the filtered light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5, reference numeral 10 generally designates a vehicle including a license plate 14 positioned on a rear of the vehicle 10. The license plate 14 defines a personalized portion 14A and a registration portion 14B. A trim piece 18 is positioned above the license plate 14 and includes an illumination system 22. The illumination system 22 includes a waveguide 26 extending a portion of the license plate 14. A first light source 30 is optically coupled with the waveguide 26 and is configured to emit light into the waveguide 26. An optical component 34 is configured to be optically coupled with the waveguide 26.

Figure 1:
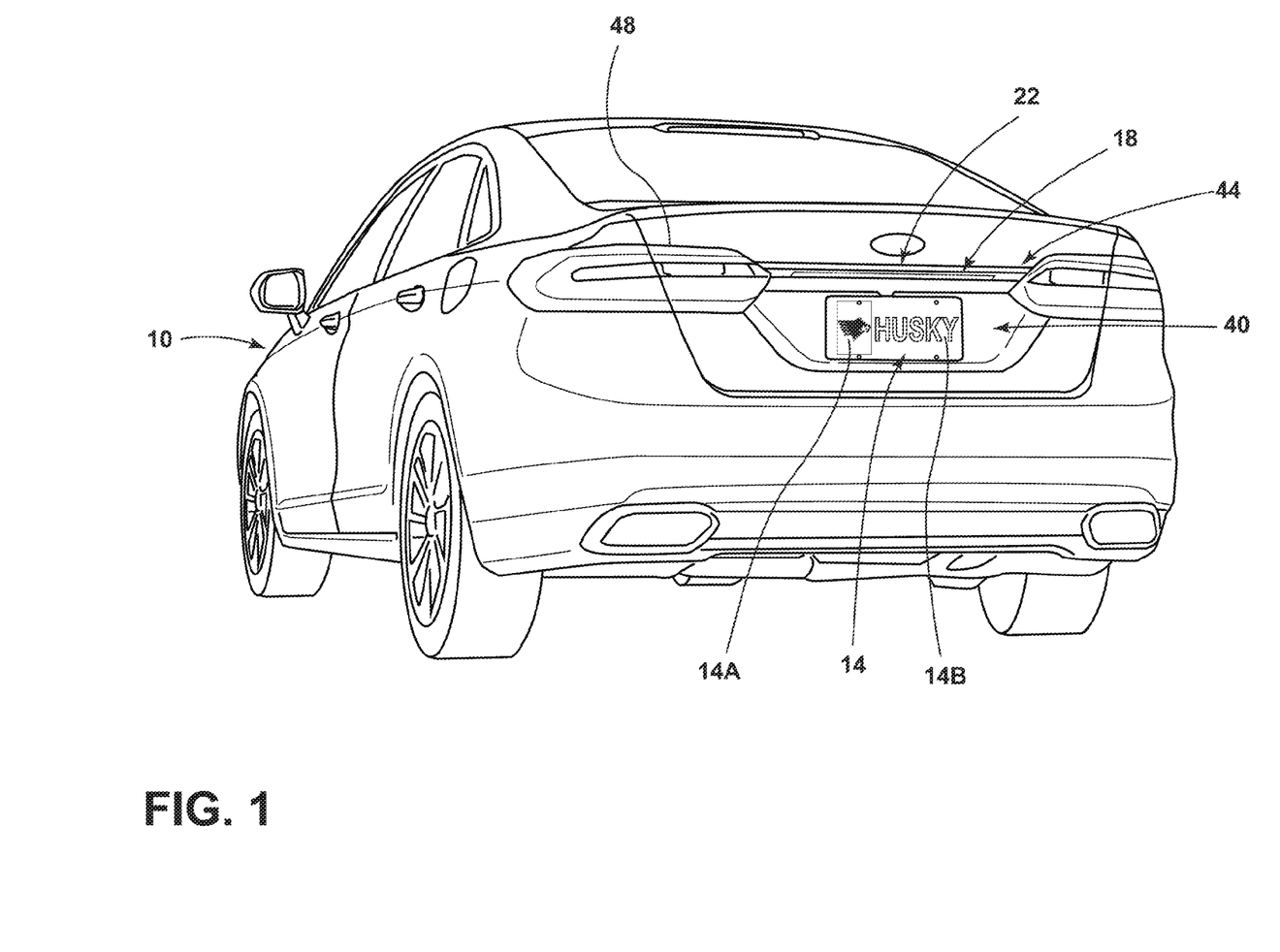
FIG. 1 is a rear perspective view of a vehicle equipped with an illumination system, according to one embodiment.
Figure 2A:
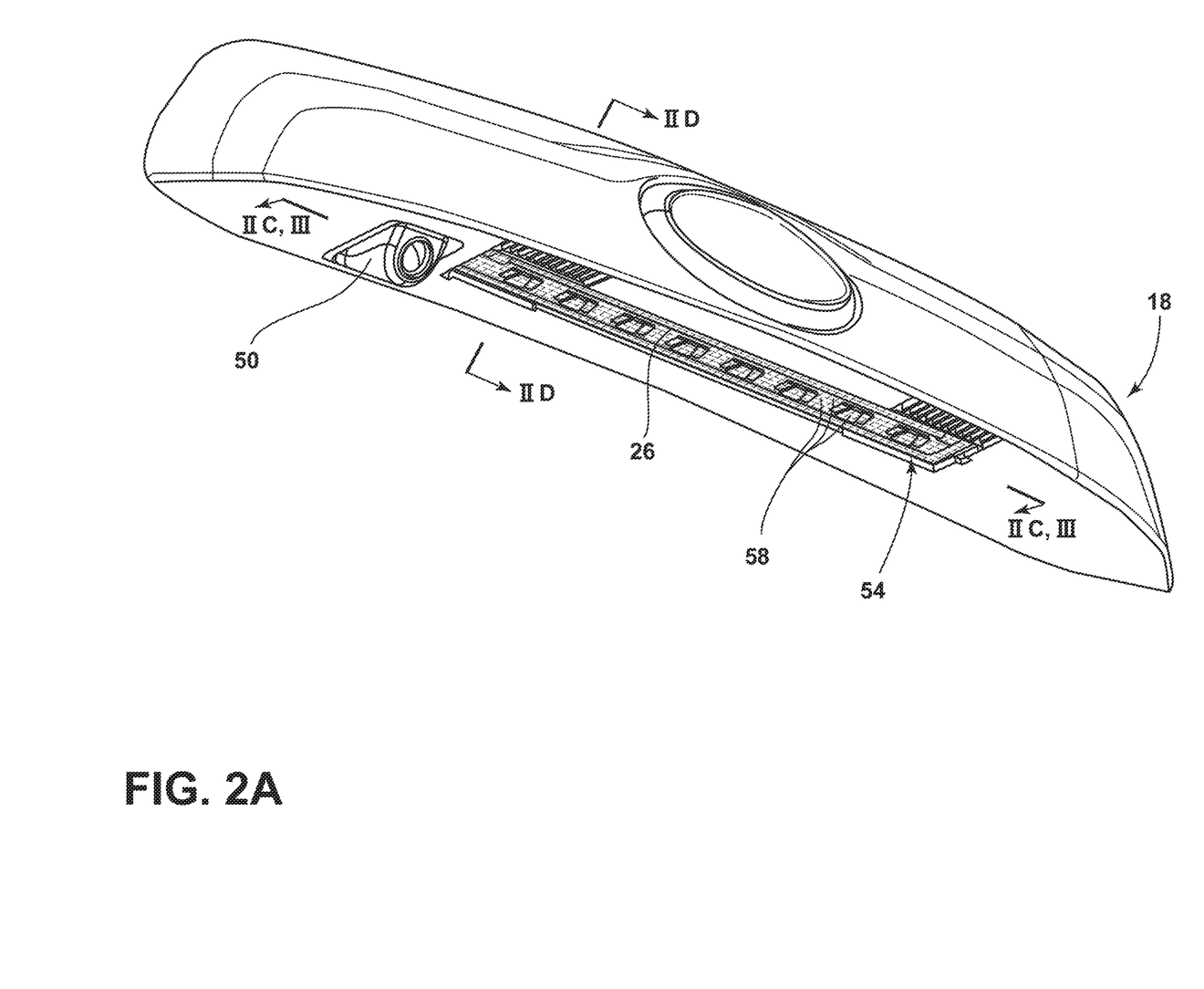
FIG. 2A is a bottom perspective view of a trim piece of the vehicle, according to one embodiment.
Figure 2B:
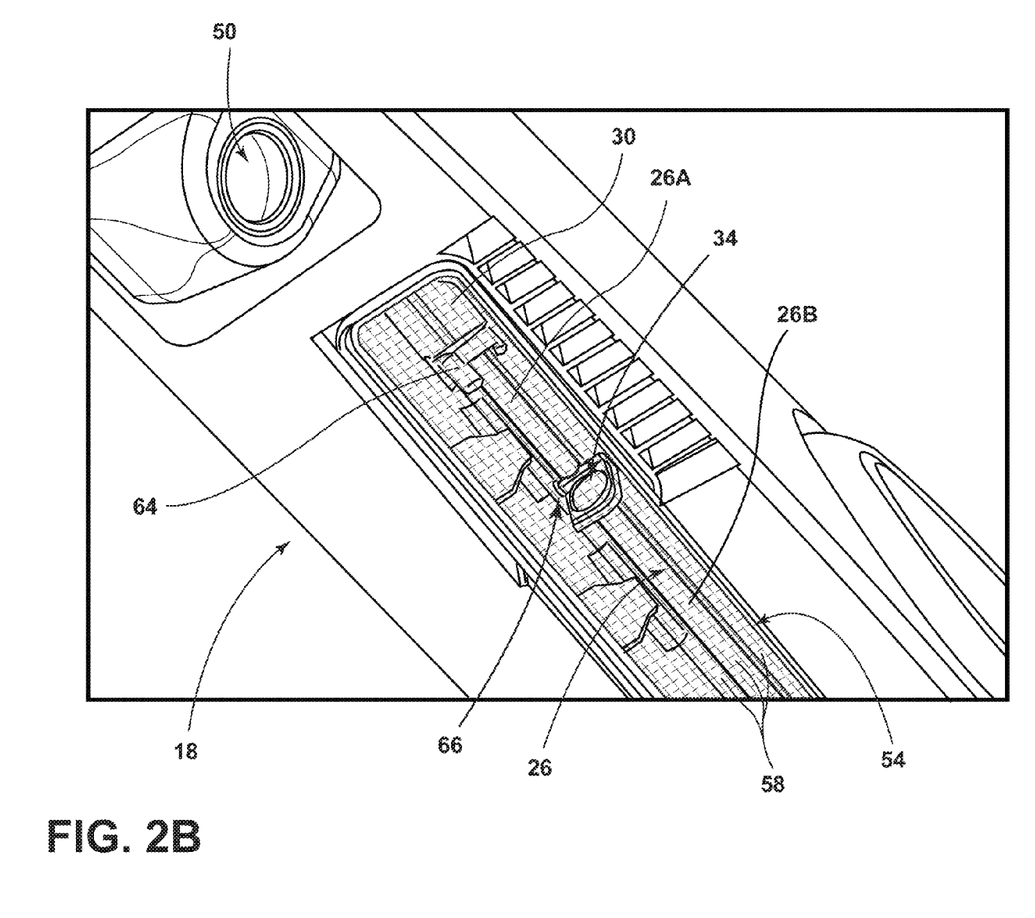
FIG. 2B is an enhanced bottom perspective view of the trim piece, according to one embodiment.
Figure 2C:
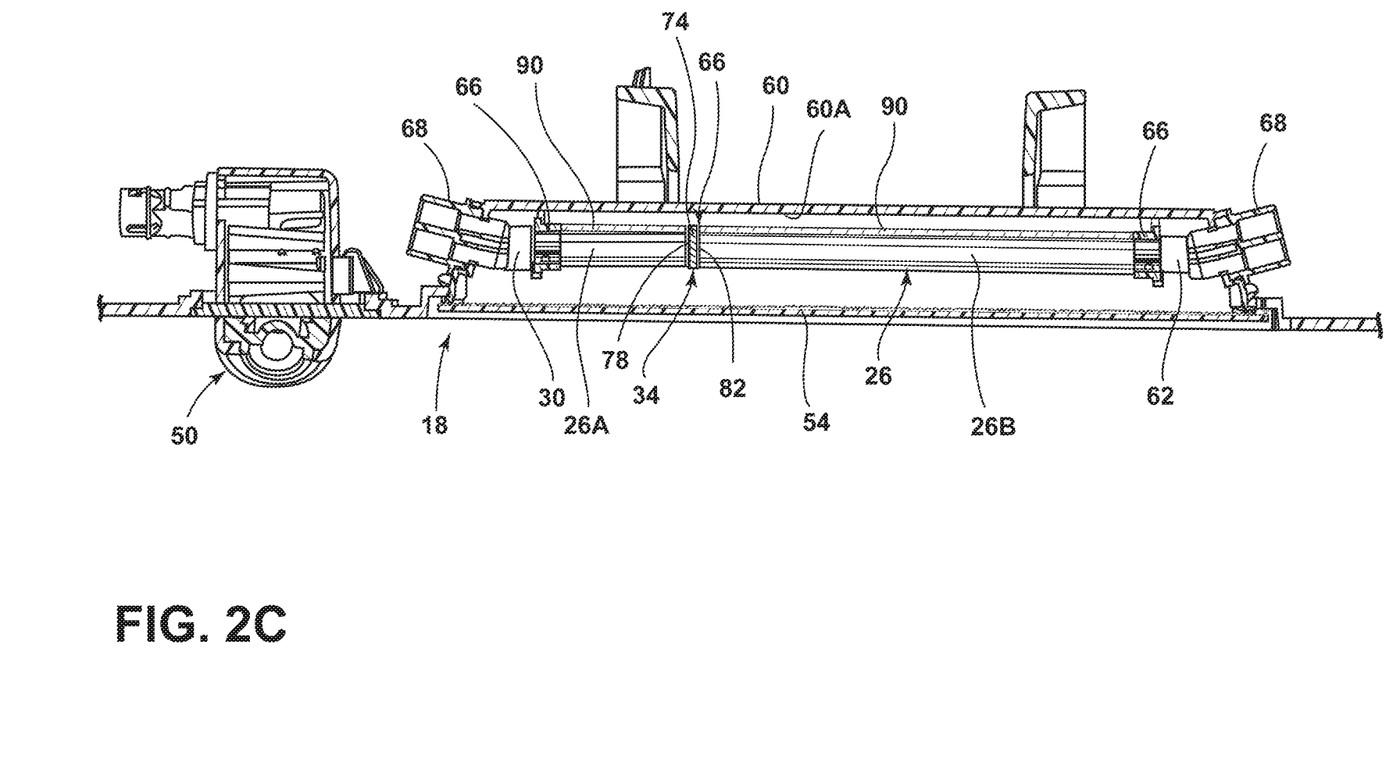
FIG. 2C is a cross-sectional view of the trim piece taken at line IIC-IIC of FIG. 2A, according to one embodiment.
Figure 2D:
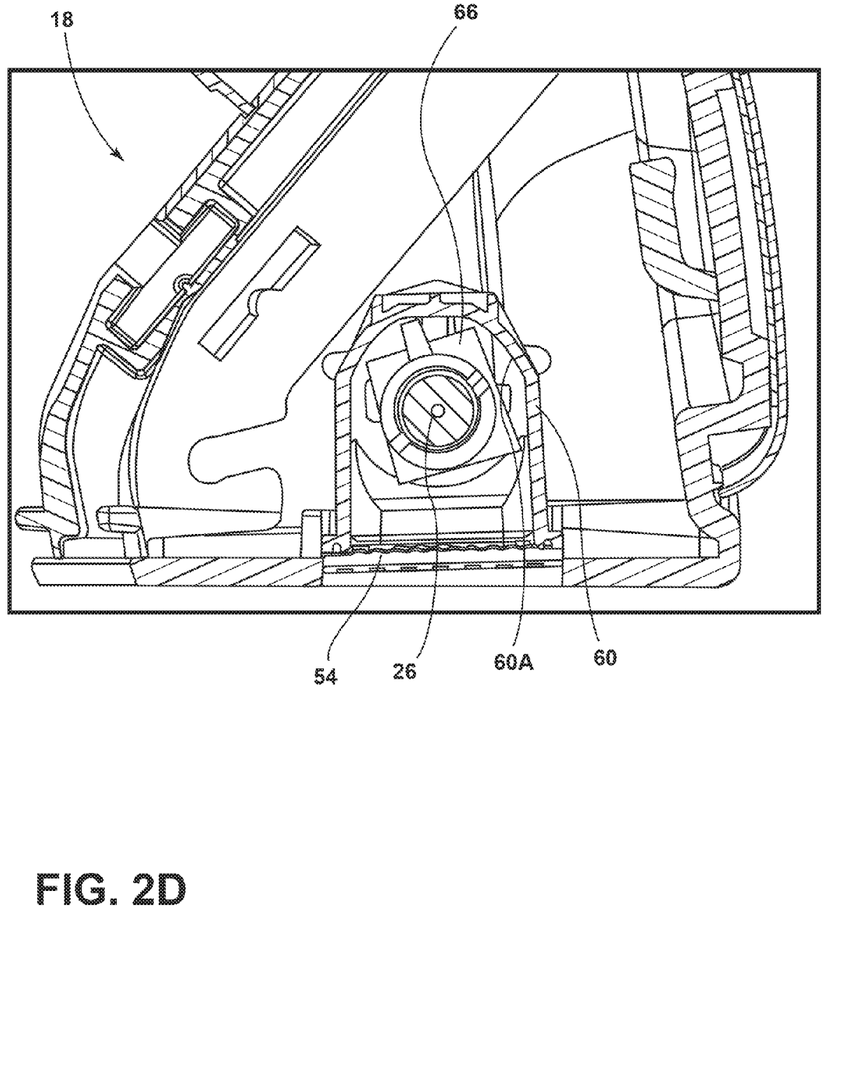
FIG. 2D is a cross-sectional view taken along line IID-IID of FIG. 2A, according to one embodiment.

Referring now to FIG. 1, the vehicle 10 includes a recessed area 40 on which the license plate 14 is disposed. Positioned above the recessed area 40 is a brow area 44 on which the trim piece 18 is located. It will be understood that the trim piece 18 may be located on the brow area 44, in the recessed area 40, or combinations thereof. The license plate 14 is positioned within the recessed area 40 of the trunk lid 48. The trim piece 18 is positioned such that the illumination system 22 may illuminate the license plate 14, the recessed area 40 and generally the rear of the vehicle 10. Although the vehicle 10 is depicted as a sedan and the license plate 14 is located on a trunk lid 48, the disclosure may be equally applied to a lift gate of a sport utility vehicle, or a tailgate of a truck, without departing from the teachings provided herein and the spirit of the disclosure. In the depicted example, the license plate 14 may be a personalized, or vanity, license plate 14. Personalized license plates 14 may include the personalized portion 14A and the registration portion 14B. The personalized portion 14A may correspond to an icon or indicia indicative of a school (e.g., university) the vehicle owner attended, a special cause (e.g., organ donation, wildlife, veterans, children, etc.) or other owner selected personalization. The personalized portion 14A may include colors and symbols not used in the registration portion 14B. The registration portion 14B may include a plurality of letters or numbers configured to identify the ownership and registration of the vehicle 10. The registration portion 14B may also include one or more registration tags such as alphanumeric characters used to indicate proper registration of the vehicle 10. Under various state and federal laws, the registration portion 14B of the license plate 14 may require a certain level of illumination or visibility. It will be understood that although depicted on the rear of the vehicle 10, the trim piece 18 and/or the illumination system 22 may be employed on a front, or sides, of the vehicle 10 without departing from the teachings provided herein.

Referring now to FIGS. 2A-2D, the trim piece 18 may also include a camera 50 facing behind the vehicle 10 (FIG. 1). The camera 50 may be used to provide a driver of the vehicle 10 with a view behind the vehicle 10 (e.g., during backing and/or parking of the vehicle 10). Positioned on an underside of the trim piece 18 is a cover 54. The cover 54 is positioned below the illumination system 22 such that the cover 54 is between the illumination system 22 and the license plate 14. The cover 54 may extend the length of the license plate 14 or only a portion of the license plate 14. The cover 54 may be formed of a transparent and/or translucent material. Exemplary materials of the cover 54 may include plastics, glasses and combinations thereof. In some embodiments, the cover 54 may include a colored material. The cover 54 may include one or more optics 58 configured to alter light emitted from the illumination system 22. In the depicted embodiment, the optics 58 may be pillow lenses, but may also include reflector cavities, Fresnel lenses, and/or other types of optics 58. The optics 58 may be spaced across the cover 54 equally or in a patterned arrangement. The optics 58 may aid in the disbursement or spreading of light from the illumination system 22 over the license plate 14 and rear of the vehicle 10. Further, the cover 54 may include one or more indicia (e.g., etched, carved or otherwise disposed) in the cover 54 to create certain lighting or aesthetic effects.

Positioned within the trim piece 18 is the illumination system 22. In the depicted example, the illumination system 22 is positioned within a housing 60. The housing 60 may be closed out by the cover 54 and may extend further than the cover 54 within the trim piece 18. As explained above, the illumination system 22 includes the waveguide 26, the first light source 30, a second light source 62 and the optical component 34. The first and second light sources 30, 62 may include an incandescent bulb, a light emitting diode, or other forms of light generation. The first and second light sources 30, 62 may be configured to emit white light, colored light, non-visible light (e.g., ultraviolet) or other electromagnetic spectra. The first and second light sources 30, 62 may each be optically coupled to an end of the waveguide 26 such that light emitted from the first and second light sources 30, 62 enters and is propagated along the waveguide 26. The first and second light sources 30, 62 may be held in place using connectors 68. The connectors 68 may be positioned through the housing 60 and configured to both hold and provide power to the first and second light sources 30, 62.

The waveguide 26 may include an optical fiber, a photonic-crystal fiber and/or a light pipe. In light pipe embodiments of the waveguide 26, the light pipe may be solid, hollow, or have an intermittent (e.g., portions being hollow and portions being solid) structure. The light pipe may include a transparent material such as a polymer, a glass, or combinations thereof. The waveguide 26 may include a number of scattering sites (e.g., materials of a different refractive index than the waveguide, reflective materials, air bubbles, etc.) disposed throughout the length of the light pipe and configured to scatter light out of the light pipe. The number and concentration of scattering sites may vary across the length of the waveguide 26 such that a uniform illumination is achieved. For example, a lower concentration of scattering sites may be disposed near the first and second light sources 30, 62 and increase with increasing distance from the light sources 30, 62. The waveguide 26 may be a single piece, or, in the depicted example, may be broken into a first waveguide portion 26A and a second waveguide portion 26B. The waveguide 26 may be supported by one or more supports 64 configured to hold the waveguide 26 in place within the housing 60. The waveguide 26 may define an aperture 66 between the first waveguide portion 26A and the second waveguide portion 26B. The aperture 66 is sized to accept the optical component 34.

The optical component 34 may include a substrate 74 which defines a first surface 78 and a second surface 82. The substrate 74 may be composed of a polymer, metal, ceramic, or glass material. In various examples, the substrate 74 may be transparent, translucent, or opaque. At least one of the first and second surfaces 78, 82 are perpendicular to the license plate 14. Disposed on the first and/or second surfaces 78, 82 may be one or more coatings. The coatings on the first and second surfaces 78, 82 may be different, the same, or include some of the same properties (e.g., reflectiveness). The coatings may be reflective, partially transmissive, transflective, or may be configured to filter light within the waveguide 26. In reflective embodiments, the reflective coating may include a metal film, a metal foil, a vacuum metallized coating and/or a light colored surface (e.g., white paint). In transmissive embodiments, the coating may be a paint, or a metal, disposed on the substrate 74. For example, the transmissive coating may include a metal film, a metal foil, and/or a vacuum metalized coating. The transmissive coating may be configured to allow less than about 1% of light, less than about 5% of light, less than about 10% of light, less than about 20% of light, less than about 30% of light, less than about 40% of light, or less than about 50% of light impinging on the coating to pass through to the substrate 74. In transflective embodiments of the coatings, the coatings may allow a portion of light to be transmitted through the substrate 74 and reflect another portion of the light back into the waveguide 26 (e.g., into the first or second waveguide portions 26A, 26B). For example, the portion of light that is reflected may be independent of wavelength (e.g., all colors and wavelength regions reflected) or dependent on wavelength (e.g., reflect some colors but not others or reflect visible light but transmit non-visible light). Further, the substrate 74 may function as a color filter (e.g., by being colored such that only certain colors, or colors of light, are permitted to be transmitted). Use of transmissive, transflective and/or color filtering embodiments of the coatings may result in filtered light (e.g., light missing one or more wavelengths of light) or unfiltered light (e.g., substantially all of the wavelengths) being propagated though and emitted from the waveguide 26.

The optical component 34 is sized and shaped to be fit into the aperture 66 of the waveguide 26. The optical component 34, and/or the waveguide 26, may define one or more attachment features (e.g., hooks, lips, edges, snap features, interlocking members) configured to hold the optical component 34 in place. In yet other embodiments, the optical component 34 may be configured to friction, or interference, fit within the aperture 66. Positioning of the optical component 34 within the aperture 66 optically couples the optical component 34 to the waveguide 26 such that the coatings of the optical component 34 may interact with the light within the waveguide 26. In reflective embodiments of the coatings, the optical component 34 interacts with the light by reflecting the light back towards its source (e.g., the light source 30 or second light source 62). In reflective embodiments, the optical component 34 may isolate the first waveguide portion 26A from the second waveguide portion 26B. In transmissive embodiments of the optical component 34, the optical component 34 interacts with the light by reflecting a portion of the light, while transmitting the remainder through the optical component 34. In color filtering embodiments, the optical component 34 interacts with the light by absorbing a portion of the light and transmitting the rest. It will be understood that transflective embodiments of the optical component 34 may be achieved by positioning a reflective coating on one side of the substrate 74 (e.g., the first surface 78) and transmissive coating on the other side (e.g., the second surface 82).

In the depicted examples, the waveguide 26 of the illumination system 22 extends through the housing 60. The housing 60 may define an inner surface 60A which is curved inward toward the illumination system 22. The inner surface 60A may include a coating configured to enhance or aid in the illumination of the license plate 14. For example, the inner surface 60A may include a reflective coating, similar to that described in connection with the reflective coatings of the optical component 34, which is configured to reflect light emitted from the waveguide 26 downward towards the cover 54. In other embodiments, the inner surface 60A may include a phosphorescent material, as explained in greater detail below, configured to emit light once charged by light emitted from the waveguide 26. Further, the waveguide 26 may include a reflective structure 90 positioned on the top of the waveguide 26, or on an opposite side of the waveguide 26 than the cover 54. The reflective structure 90 may be similar to that described in connection with the reflective coatings of the optical component 34 (e.g., metal coatings, light colored surfaces, etc.), or may be different. The reflective structure 90 is configured to reflect light emitted from the waveguide 26 back into the waveguide 26 such that the light is emitted towards the cover 54 and towards the license plate 14.

Referring again to FIGS. 2A-D, in examples where the inner surface 60A includes the phosphorescent coating, the housing 60 and/or coating may be prepared by dispersing one or more persistent phosphorescent materials in a polymer matrix to form a homogenous mixture using a variety of methods. For example, the housing 60 may be rendered by dispersing the phosphorescent materials into a solid state solution (homogeneous mixture in a dry state) that may be incorporated in a polymer matrix formed by extrusion, injection molding, compression molding, calendaring, thermoforming, etc. The phosphorescent materials may include a binder (e.g., polymer) and be disposed on the inner surface 60A of the housing 60 and may be applied by painting, screen printing, flexography, spraying, slot coating, dip coating, roller coating, bar coating, and/or any other methods known in the art. It will be understood that the phosphorescent materials, as described herein, may equally be applied to the license plate 14 (e.g., on the text, lettering, symbols, etc.) or reflective structure 90 in order to increase visibility of the vehicle 10 and/or the license plate 14.

The persistent phosphorescent materials may be defined as being able to store an activation emission and release light gradually (i.e., a perceptible glow), for a period of several minutes or hours, once an activation emission is no longer present. The decay time may be defined as the time between the end of excitation from the activation emission and the moment when the light intensity of the phosphorescent structure drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent materials, according to at least one embodiment, may be operable to emit light at or above an intensity of 0.32 mcd/m$^2$ after a period of about 10 minutes. Additionally, the persistent phosphorescent materials may be operable to emit light above or at an intensity of 0.32 mcd/m$^2$ after a period greater than about 30 minutes, greater than about 60 minutes, greater than about 2 hours, greater than about 5 hours, greater than about 10 hours or greater than about 24 hours. Accordingly, the persistent phosphorescent materials may continually illuminate in response to excitation through a plurality of excitation sources emitting an activation emission, including, but not limited to, ambient light (e.g., the sun), light from the waveguide 26 (e.g., the first and/or second light sources 30, 62), light sources proximate the vehicle 10 (e.g., light poles or parking garage lights) and/or any other light source disposed onboard or exterior to the vehicle 10. In some embodiments, the wavelength of light emitted by the phosphorescent material of the inner surface 60A may be used to charge a phosphorescent material of the license plate 14. It will be understood that the phosphorescent material of the inner surface 60A may be different (e.g., in color, intensity, length of persistence, etc.) than the license plate 14.

The periodic absorption of the activation emission from the excitation sources may provide for a substantially sustained charge of the persistent phosphorescent materials to provide for a consistent passive illumination. For example, the waveguide 26 may be pulsed, or otherwise periodically be activated to charge the phosphorescent materials, such that the inner surface 60A and/or license plate 14 provides a constant or changing level of emitted phosphorescent light. In a specific example, the waveguide 26 may be pulsed while the vehicle 10 is in an off state (i.e., vehicle battery charge permitting) such that the license plate 14 may remain illuminated even when the vehicle 10 is off.

The persistent phosphorescent materials may correspond to alkaline earth aluminates and silicates, for example, doped disilicates, or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. A polymeric material of the coatings may include between about 0.1% to about 25.0% of the second phosphorescent material either by weight or mole fraction. In embodiments utilizing the phosphorescent coating on the inner surface 60A, the coating may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation. Further, the phosphorescent material of the license plate 14 may include the same or similar composition.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof. The light emitted from the phosphorescent material, and thereby the license plate 14 and/or inner surface 60A, may be of a desired brightness such that the personalized portion 14A and/or registration portion 14B are visible. According to one embodiment, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate exemplary embodiment, 100 parts of a commercial solvent-borne polyurethane, such as Mace resin 107-268, having 50% solid polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane, may be blended to yield a low rare earth mineral phosphorescent structure or be used in the phosphorescent coating. It will be understood that the compositions provided herein are non-limiting examples. Thus, any phosphor known in the art may be utilized for utilization as a phosphorescent material or structure without departing from the teachings provided herein. Moreover, it is contemplated that any long persistent phosphor known in the art may also be utilized without departing from the teachings provided herein.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the phosphorescent materials of the inner surface 60A, license plate 14, or reflective structure 90, may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence). The photoluminescent material may be activated by the same or a different activation emission as the persistent phosphorescent materials. It will be understood that any description involving the phosphorescent materials may be replaced with the photoluminescent materials without departing from the teachings provided herein and the spirit of the disclosure.

Figure 3:
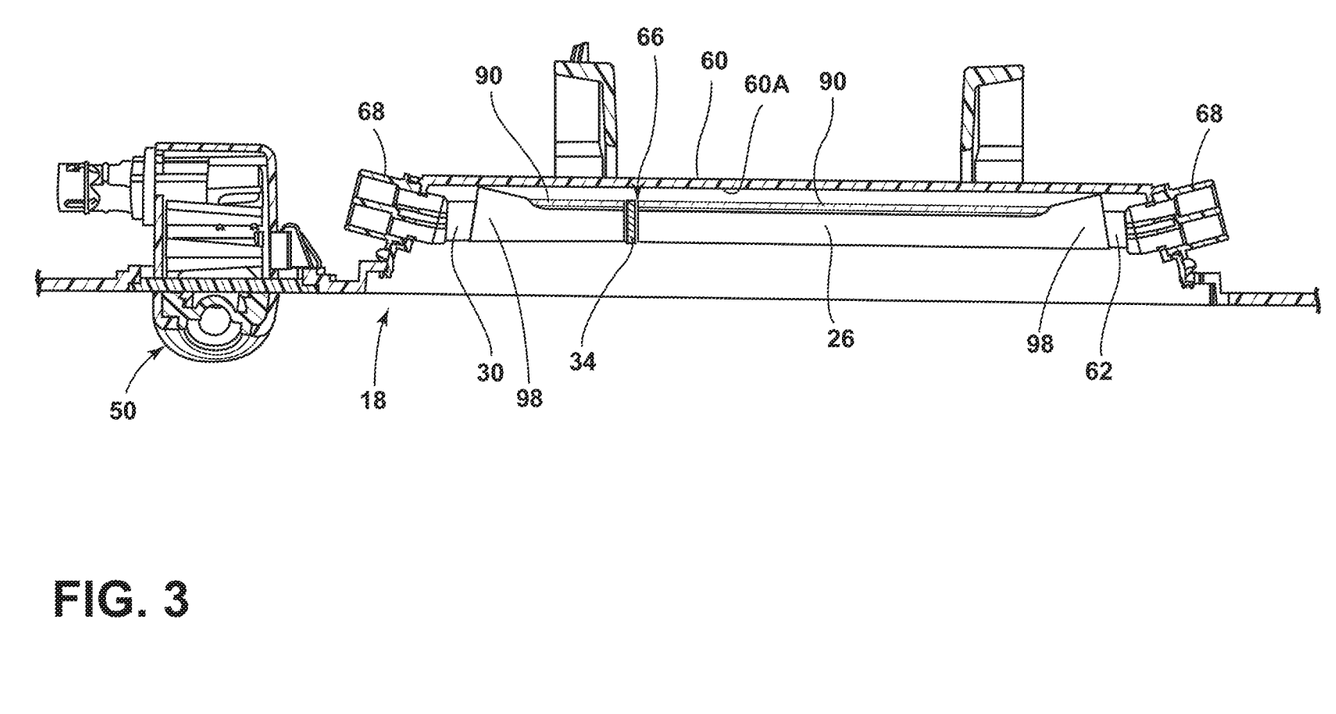
FIG. 3 is a cross-sectional view taken along line of FIG. 2A, according to another embodiment.

Referring now to FIG. 3, depicted is an alternate embodiment of the illumination system 22 and trim piece 18. In the depicted embodiment, the cover 54 (FIGS. 2A-D) is replaced with the waveguide 26 such that the waveguide 26 is now an "A-surface" component or exposed to the exterior of the vehicle 10. The waveguide 26 may define a light coupling 98 which optically couples the waveguide 26 to the first and second light sources 30, 62. The waveguide 26 may define a flat surface which faces the license plate 14 through which light is emitted. Such an embodiment may be advantageous in that the light emitted from the waveguide 26 would no longer go through the cover 54 and risk potential loss of intensity. Such embodiments may include the reflective structure 90 positioned on the waveguide 26, as explained above.

Figure 4:
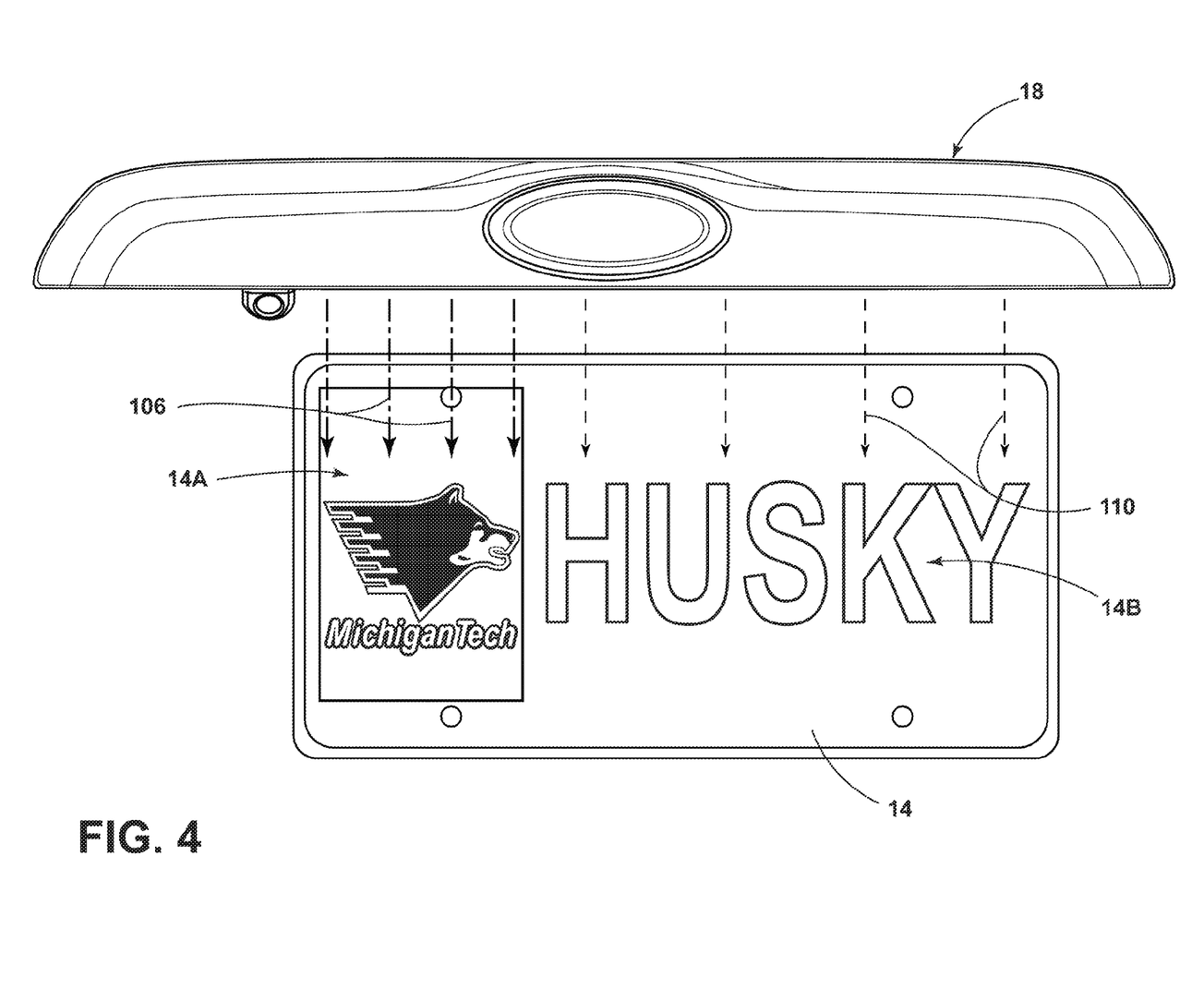
FIG. 4 is an elevational view of the license plate and the trim piece, according to one embodiment.

Referring now to FIG. 4, the illumination provided by the illumination system 22 is configured to illuminate the license plate 14. The light from the waveguide 26 is directed downward from the trim piece 18 to provide substantially even illumination to the license plate 14. Use of the optical component 34 may be used to separate the illumination into personalized illumination 106 and registration illumination 110. The registration illumination 110 and personalized illumination 106 may each have differing colors, intensities, illumination patterns, etc., based on the light provided by the first and second light sources 30, 62. For example, the personalized light 106 may be configured to illuminate the personalized portion 14A of the license plate 14 in a colored light (e.g., a color of the school or cause) and the registration light 110 may be configured to illuminate the registration portion 14B in white light. Further, the illumination intensity of the registration illumination 110 may be greater than, less than, or approximately equal to that of the personalized illumination 106. Use of the waveguide 26 and/or the optics 58 of the cover 54 may provide even and consistent light across the license plate 14 without creating shadows.

Figure 5:
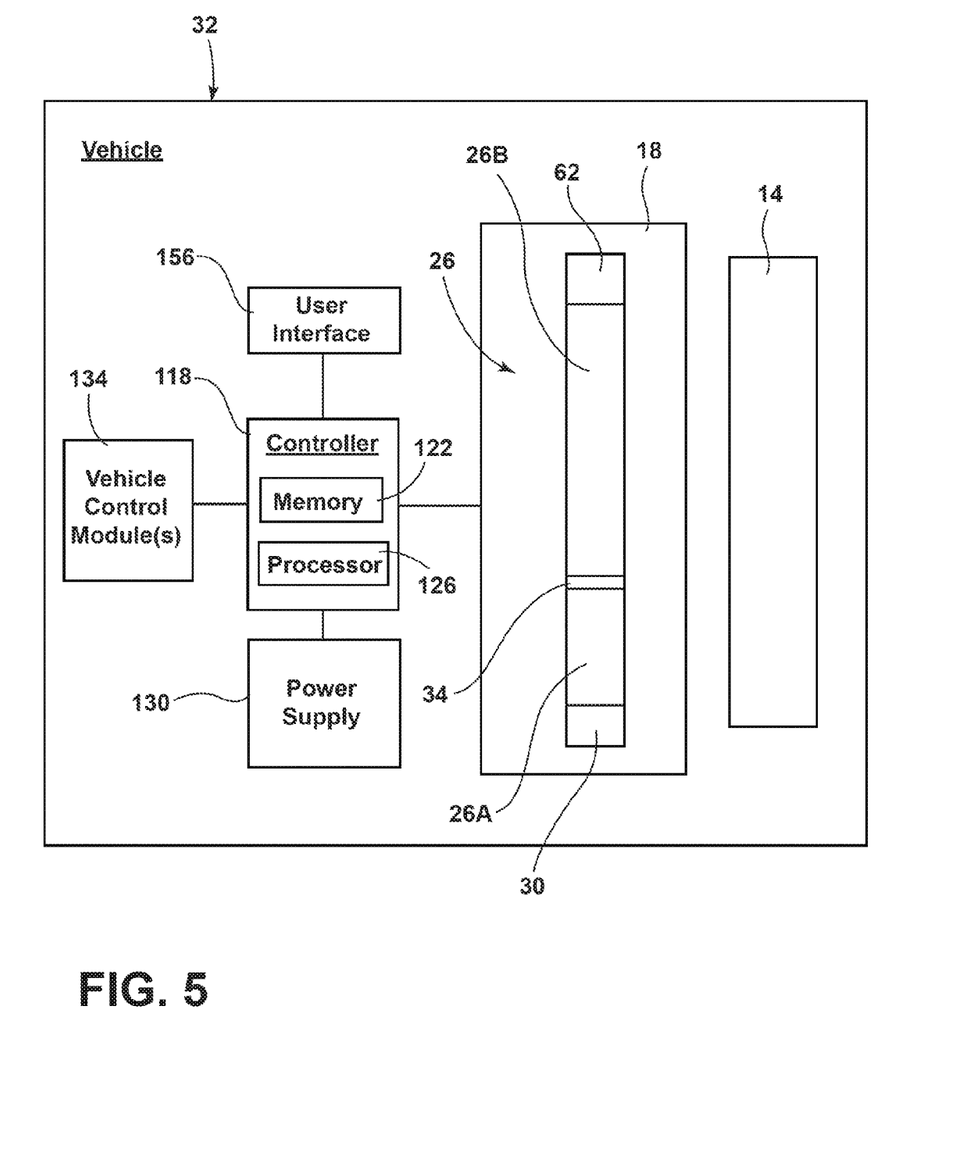
FIG. 5 is a block diagram of the vehicle and the illumination system.

Referring to FIG. 5, a block diagram of the vehicle 10 is shown in which the trim piece 18 is implemented. The vehicle 10 includes a controller 118 in communication with the first and second light sources 30, 62. The controller 118 may include memory 122 having instructions contained therein that are executed by a processor 126 of the controller 118. The controller 118 may provide electrical power to the first and second light sources 30, 62 via a power source 130 located onboard the vehicle 10. In addition, the controller 118 may be configured to control the light output of the first and second light sources 30, 62 (i.e., and thereby control light output by the waveguide 26) based on feedback received from one or more vehicle control modules 134 such as, but not limited to, a body control module, engine control module, steering control module, brake control module, the like, and/or a combination thereof. By controlling the light output of the first and second light sources 30, 62, the waveguide may illuminate in a variety of colors and/or patterns to provide an aesthetic appearance to the license plate 14 and/or rear of the vehicle 10, or may provide vehicle information to an intended observer.

The processor 126 may be configured to execute color illumination routines stored within the memory 122. A user and/or driver of the vehicle 10 may utilize a user interface 156 to indicate which color routine is to be executed. The user may input which type of optical component 34 is inserted in the waveguide 26 such that the proper color illumination routine is performed. Based on the color illumination routine selected and the type of optical component 34 inserted in the waveguide 26, the processor 126 may control the second and/or first light sources 62, 30 to emit white light, colored light, or no light. For example, if a color filter example of the optical component 34 is selected, the processor 126 may control the second light source 62 to emit white light and rely on the optical component 34 to filter out undesired colors of light from the white light such that the second waveguide portion 26B emits white colored registration illumination 110, while the first waveguide portion 26A emits the personalized illumination 106 in the color that was not filtered out of the white light. In another example, the processor 126 may be configured to execute a color illumination routine based on use of reflective examples of the optical component 34. For example, if the user inputs into the user interface device 156 that the optical component is reflective, the processor 126 may control the second light source 62 to emit white light to/from the registration illumination 110 and the first light source 30 to emit colored light corresponding to the desired color of the personalized illumination 106. In transmissive embodiments of the optical component 34, the processor 126 may be configured to execute a color illumination routine configured to mix colors present from the second light source 62 and the first light source 30 within the first waveguide portion 26A to form a unique (e.g., user designed) color. Additionally or alternatively, the processor 126 may be configured to execute one or more standard color illumination routines, such as providing colored or white illumination when a key fob is detected proximate the vehicle 10, when the trunk lid 48 is lifted, or other predefined events (e.g., a person detected proximate a rear of the vehicle 10 for a predetermined period of time). In yet other embodiments, the processor 126 may control the first and second light sources 30, 62 to both emit white light, such that the license plate 14 is fully illuminated in white light.

For the purposes of describing and defining the present teachings, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims, by their language, expressly state otherwise.

What is claimed is:

1. A vehicle comprising:
    a license plate defining a personalized portion and a registration portion; and
    a trim piece positioned above the license plate and including an illumination system comprising:
        a waveguide extending the length of the license plate;
        a light source configured to emit light into the waveguide; and
        an optical component coupled with the waveguide to differentiate the light emitted to the personalized portion and the registration portion.

2. The vehicle of claim 1, wherein the optical component is inserted within an aperture in a plane between the personalized portion and the registration portion.

3. The vehicle of claim 1, wherein the optical component comprises:
    a substrate defining first and second surfaces; and
    a coating positioned on at least one of the first and second surfaces.

4. The vehicle of claim 3, wherein the substrate is at least partially transmissive.

5. The vehicle of claim 3, wherein at least one of the first and second surfaces of the optical component is perpendicular to the license plate.

6. The vehicle of claim 3, wherein the coating of the optical component comprises a color filter.

7. The vehicle of claim 3, wherein the coating of the optical component comprises a vacuum metallized coating.

8. The vehicle of claim 1, wherein the optical component is at least partially transflective.

9. The vehicle of claim 1, wherein the trim piece further comprises:
    a cover positioned between the waveguide and the license plate, wherein the cover comprises a plurality of optics.

10. A vehicle comprising:
    a license plate; and
    an illumination system positioned proximate the license plate within a trim piece comprising:
        a waveguide defining an aperture;
        a first light source configured to emit light into the waveguide; and
        an optical component configured to be inserted within the aperture and interact with light within the waveguide to differentiate the light emitted to a personalized portion and a registration portion of the license plate.

11. The vehicle of claim 10, further comprising:
    a second light source optically coupled with the waveguide.

12. The vehicle of claim 11, wherein the first light source and second light source are optically coupled to the waveguide on opposite sides of the aperture.

13. The vehicle of claim 10, wherein the optical component optically isolates a portion of the waveguide from another portion of the waveguide.

14. The vehicle of claim 10, wherein the waveguide further comprises:
    a reflective structure positioned on a top side of the waveguide.

15. The vehicle of claim 10, wherein the waveguide defines a flat surface facing the license plate.

16. The vehicle of claim 10, wherein the light source is a white light source and the second light source is a colored light source.

17. A method of illuminating a license plate, comprising the steps:
    directing light from a first light source into an end of a waveguide positioned in a trim piece above the license plate and extending a length of the license plate;
    illuminating a first portion of a license plate using the light;
    filtering a portion of the light using an optical component positioned within the waveguide; and
    illuminating a second portion of the license plate using the filtered light.

18. The method of claim 17, further comprising the step:
    reflecting an unfiltered portion of light through the waveguide.

19. The method of claim 18, wherein the filtered light illuminates a personalized portion of the license plate and the unfiltered light illuminates a registration portion of the license plate.

20. The method of claim 19, wherein the optical component comprises at least one of a transflective coating and a color filter.

\* \* \* \* \*